United States Patent

[11] 3,579,240

[72] Inventor Andrew F. Deming
Alliance, Ohio

[21] Appl. No. 725,294
[22] Filed Apr. 30, 1968
[45] Patented May 18, 1971
[73] Assignee Alliance Manufacturing Company, Inc.

[54] SELECTIVE RADIO RECEIVER SYSTEM
21 Claims, 1 Drawing Fig.

[52] U.S. Cl. .... 343/228, 317/142, 325/37, 325/393, 343/225
[51] Int. Cl. .... H04b 1/00, H04b 1/06, H04b 7/20
[50] Field of Search .... 343/225, 228; 317/142, 147, 148.5; 325/64, 37, 393; 340/171

[56] References Cited

UNITED STATES PATENTS

| | | | |
|---|---|---|---|
| 3,050,661 | 8/1962 | Jenkins | 343/225X |
| 3,268,765 | 8/1966 | Randolph | 317/148.5X |
| 3,372,314 | 3/1968 | Chastain | 343/225X |
| 3,469,152 | 9/1969 | Bosman | 317/148.5X |
| 3,484,656 | 12/1969 | Wallentowitz | 317/148.5X |
| 2,992,367 | 7/1961 | Sinn | 317/142X |
| 3,333,272 | 7/1967 | Deming | 343/225 |
| 3,359,558 | 12/1967 | Schanbacher | 343/225 |
| 3,438,037 | 4/1969 | Leland | 343/225 |

*Primary Examiner*—Donald J. Yusko
*Assistant Examiner*—Scott F. Partridge
*Attorney*—Woodling, Krost, Granger and Rust

ABSTRACT: The disclosure shows a remotely controlled radio receiver circuit which may be used to control a garage door operator, for example, from a low-power remote transmitter. The signal emitted by the transmitter includes a carrier as modulated by a lower frequency, for example an audiofrequency, which signal is amplified in the receiver, detected and supplied to an audiofrequency resonant load and to a resistance load. These two loads are connected in opposition so that if the received signal is of the proper carrier frequency to be amplified and passed through the first stages of the receiver and if the audiofrequency is of the proper preselected frequency to be resonated by the audiofrequency resonant circuit, a resonant voltage signal is passed. A first time delay capacitor is connected in a circuit to give only time delay of turn turn-on of a load relay, and a second time delay capacitor is connected in circuit to give only time delay of dropout of the relay, and in this manner telemetering or other relatively rapid pulsed signals, even of the proper carrier and audiofrequencies, do not actuate the relay. The foregoing abstract is merely a resume of one general application, is not a complete discussion of all principles of operation or applications, and is not to be construed as a limitation on the scope of the claimed subject matter.

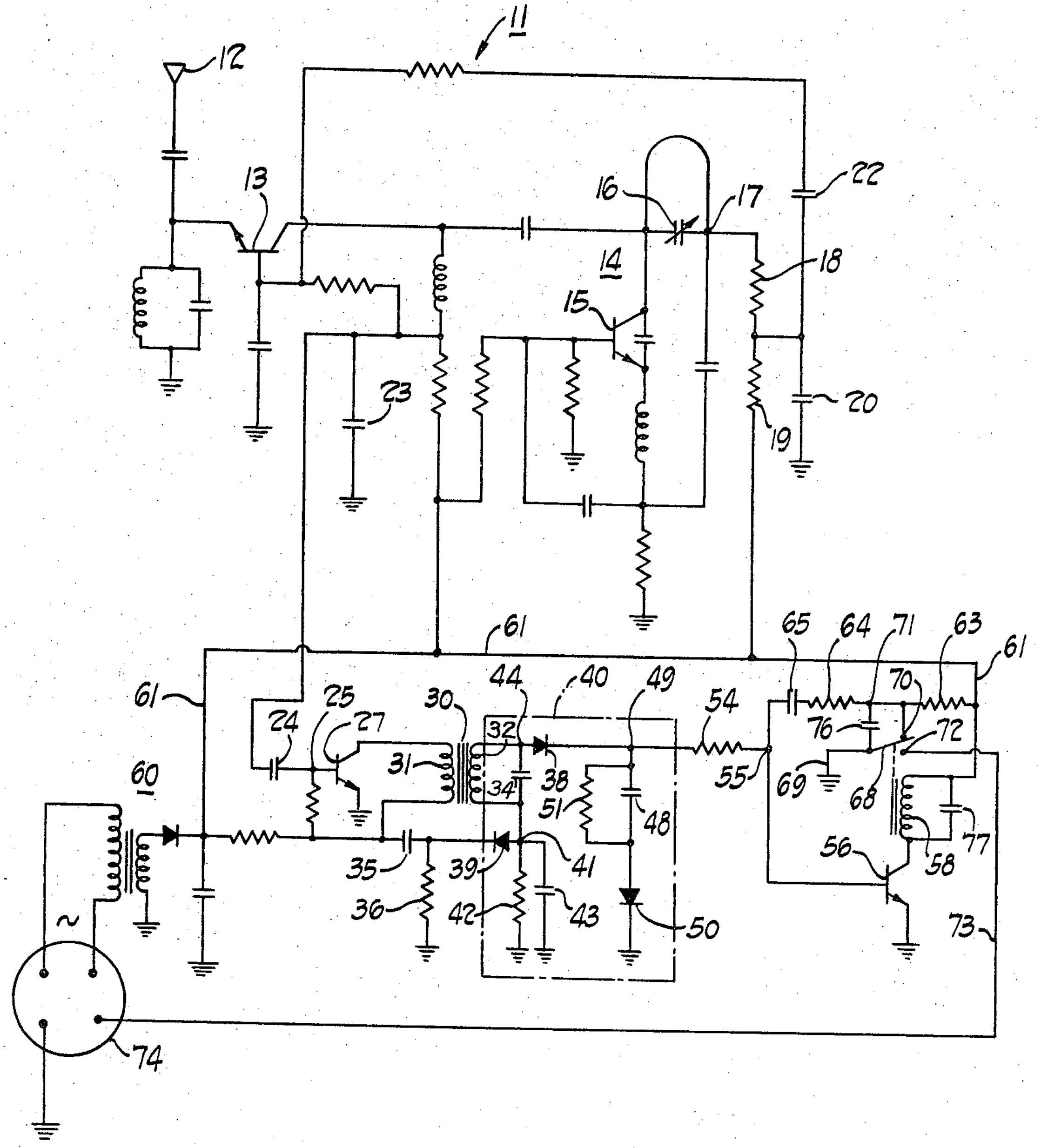
INVENTOR.
A.F. DEMING
BY Woodling, Krost, Granger and Rust
ATTORNEYS.

SELECTIVE RADIO RECEIVER SYSTEM

BACKGROUND OF THE INVENTION

In remote control radio systems including a transmitter and a receiver wherein the transmitter may be operated to provide a low-power signal to the receiver and the receiver then controls some controllable electrical device, it is difficult to obtain a high degree of selectivity consistent with economy of manufacture and reliability of the complete system. Such systems are used in several applications and one such use is for the remote control of electrically operated garage doors with a lower powered transmitter being operated from an automobile at ranges of 50 to 200 feet, for example. It is highly desirable to provide some coding of the signal so unauthorized persons may not actuate the receiver and gain access to the garage. Hence a system which is used is to provide different carrier frequencies. The applicable government regulations concerning radio systems of this type limit the range and frequency at which the system may operate thus limiting the number of possible codes obtainable by different carrier frequencies. A refinement provides different modulation or keying frequencies superimposed on the carrier frequency but this increases the cost and introduces complexities into the transmitter and receiver of the system. The use of multiple modulation or intelligence frequencies superimposed on the carrier is only effective where the receiver is sufficiently selective to be able to adequately distinguish between two different modulation frequencies. A further problem is when two carrier frequencies may be separated by only a small amount and the intermodulation between these two carriers provides a difference frequency equal to the modulation frequency to which a particular receiver is tuned. Another related problem is when two superregenerative receivers are used, the squelch frequencies are free running and can wander, and the beat between these two squelch frequencies can provide an audiofrequency signal. In each of these cases this may cause false operation because the receiver will receive both the correct carrier plus the correct modulation frequency. If the receiver circuits are made more selective, then it becomes more difficult to keep that particular transmitter and receiver in a single system aligned for operation of that receiver from only that transmitter. Also this involves more expensive and additional circuit components.

One solution that has been used is to provide a detector system with two different detectors, a first to detect the on-frequency signal and a second to detect all the off-frequency signals. The outputs of these two detectors are connected in opposing relationship and the total signal is used to control an output, thus indicating the presence of the desired signal. Examples of such circuits are found in the Undy U.S. Pat. No. 2,788,521 and Deming U.S. Pat. No. 3,333,272.

In recent years garage door operator remote control devices have used the VHF band for example 250 mHz. and at these frequencies there is considerable fading and Fresnel effect on the received signal from a moving transmitter. Also low-power transistorized transmitters are currently in use and accordingly a low-power signal is received at the receiving end. The Fresnel effect is dependent upon the difference in path length between the direct signal and a reflected signal from a moving transmitter and accordingly the combined signal on the receiving antenna varies in intensity because of alternate addition and subtraction of the direct and the reflected waves. Also human nature being what it is, the user of the garage door operator transmitter usually attempts to open the garage door at the maximum possible range. This means he presses the button on the transmitter at the maximum range whereat the received signal on the receiving antenna is at the threshold of sensitivity. If now due to the Fresnel effect or other reasons the signal fades, the output relay in the radio receiver will tend to drop out. Additionally at this fringe area operation at the threshold of sensitivity the signal-to-noise ratio will be at its worst possible condition and random noise signals having some on-frequency components may tend to trip the circuit into operation. Accordingly the radio receiver must be highly selective for operation at the threshold of sensitivity without having any false operation from improperly coded signals and yet the circuit must be capable of economical manufacture so that it will be competitive in the market place.

SUMMARY

The invention may be incorporated in a radio receiver system for receiving a given frequency signal and subject to random noise, comprising, in combination amplifier means for said given frequency signal, detector means having an input from the output of said amplifier means and having an output terminal, a relay, means connecting the output terminal of said detector means to said relay to control the energization of said relay, and first means to delay only the pull-in but not the dropout of said relay. Other objects and a fuller understanding of the invention may be had by referring to the following description and claims, taken in conjunction with the accompanying drawings.

BRIEF DESCRIPTION OF THE DRAWING

The single FIGURE is a schematic drawing of a radio receiver circuit incorporating the invention.

DESCRIPTION OF THE PREFERRED EMBODIMENT

The drawing shows a preferred embodiment of the invention incorporated in a radio receiver system 11. The radio receiver system may be used for the remote control of a physical system, for example a garage door operator. The radio receiver system 11 is adapted to be operative on a received signal of a predetermined radiofrequency carrier modulated or keyed by a given audio or lower frequency signal and also subject to receiving random noise signals. The system 11 includes a receiving antenna 12 supplying an input to a transistor 13 which is an isolation stage. The signal is then passed to a superregenerative circuit 14 which includes a transistor 15 and a parallel resonant output circuit 16. This parallel resonant output circuit 16 is tuned to a predetermined radiofrequency carrier which for example might be in the order of 250 mHz. The output of the superregenerative circuit 14 appears at terminal 17 and contains the carrier frequency, the modulation frequency, which in this example may be an audiofrequency, and also includes a squelch frequency intermediate these two frequencies. This squelch frequency depends upon the constants of the circuit 14 and may be 600 kHz. for example. This output is applied to a resistor 18, a resistor 19 and a capacitor 20, which presents a low impedance to ground for the squelch frequency and accordingly the modulation frequency signal is passed by a capacitor 22 to the transistor 13 in a reflex circuit for amplification of such modulation frequency signal. This amplified output appears across a capacitor 23 and is passed by a capacitor 24 to input terminal 25 of a lower frequency amplifier 27. The resistors 18 and 19 and capacitor 20 form a band pass means to pass a band of frequencies, in this case the lower frequency in the audiofrequency range, from the output of the superregenerative circuit to the input of the lower frequency amplifier 27. The lower frequency amplifier 27 is shown as a transistor supplying an output to a lower frequency resonant circuit in this case an audiofrequency transformer 30. This transformer has a primary winding 31 and a secondary winding 32. A capacitor 34 is connected across the secondary winding 32 to tune the output to resonance at the given lower frequency signal. This may be between 7 and 17 kHz., for example. The output from the transistor 27 is also applied across a capacitor 35 and resistor 36 to ground, and all output signals of the transistor 27 appear across the resistor 36. This is all audio signals including the random noise because such audiofrequency signals are passed by the capacitor 24. A first unidirectional current device shown as a diode detector 38 is provided within a detector means 40. A second unidirectional conducting means shown as a second diode detector 39 is also within the detector means 40. The second diode detector is connected between the junction of capacitor 35 and resistor 36 and a terminal 41, which is at the lower end of secondary winding 32. A resistor 42 connects this terminal 41 to ground with an audiofrequency bypass capacitor 43 connected in parallel therewith. The resistor 42 may be considered the DC load resistor for the second detector 39 and because of the polarity of the detector 39, terminal 41 will be negative, primarily because of the random noise.

Detector 38 is poled oppositely to detector 39 and only when the upper terminal 44 of the secondary winding 32 is positive, will detector 38 be able to conduct. A first time delay capacitor 48 is connected between a terminal 49 and a unidirectional conducting device or third diode detector 50. The other terminal of this diode detector 50 is connected to ground. A discharge resistor 51 is connected in parallel with the time delay capacitor 48.

A current limiting resistor 54 is connected between the terminal 49 and a terminal 55 which is connected to an input, in this case the base, of a transistor 56. A relay 58 is connected to a DC power supply 60 providing a DC operating voltage to the relay 58 on a lead 61. This relay controls single pole, double throw contacts with a contact blade 68 connected to ground 69. The normally closed contacts 70 are connected to a terminal 71 at the junction of first and second bleeder resistors 63 and 64. A second time delay capacitor is connected in series with resistor 64 between terminals 71 and 55. The normally open contacts 72 are connected by a lead 73 to a terminal of a four-conductor connecting plug 74 of the system 11. A protective capacitor 76 is connected between terminal 71 and ground, and a filter capacitor 77 is connected across the winding of relay 58.

OPERATION

The radio receiver system 11 may be conveniently used in a remote control of a physical device, for example, the remote control of a garage door operator from low-power transmitter. Current practice in the industry is to use small hand held transmitters which are transistorized and powered by a small dry cell battery and have low radiated power output in the order of 1 microwatt maximum. This low-power output coupled with the high frequency currently used, namely in the 250 to 300 mHz. band, has caused erratic operation among devices of this type in the past. The upper VHF band is subject to ghosts and reflections as well as Fresnel zone-type interference because the transmitter is usually moving. In the usual case the transmitter is located inside the automobile and may be mounted on the instrument panel or clipped to the sun visor of the automobile. As the user approaches the garage in driving his automobile he presses a button on the transmitter to place it in operation. The transmitter emits a coded signal, namely one of a plurality of carrier frequencies and one of a plurality of modulation or keying frequencies. In this preferred embodiment it has been assumed that the carrier frequency is an RF carrier of about 250 mHz. and the modulation or keying frequency is an audiofrequency for example between 7 and 14 kHz. If the incoming signal received on the receiving antenna 12 is not of the proper carrier frequency, then it will be rejected by the tuned circuit 16. If the carrier frequency is of the predetermined carrier frequency for this particular receiver system 11, then the parallel resonant output circuit 16 will accept this carrier frequency to have this carrier amplified and passed to the lower frequency amplifier 27. Because of the resistance coupled nature of this transistor amplifier, it has a fairly linear frequency versus amplification curve and also has a high gain in the order of 1,000 to 10,000. The superregenerative circuit 16 also has a high gain, so that the gain of the entire system 11 may be in the order of 1,000,000 to make certain that there is a sufficient audiofrequency signal on the secondary winding 32 as well as a sufficient signal primarily from the noise across load resistor 42. It has been found that a signal of approximately 5 microvolts on the receiving antenna 12 is sufficient to pull in the relay 58 and this shows the overall high gain of the system 11. This sensitivity of about 5 microvolts is very desirable for the low-power transmitters currently being used with these remote control receivers.

All audiofrequencies which are passed to this lower frequency amplifier 27 will be amplified therein. If the received signal has the proper given audiofrequency to which the resonant circuit 32—34 is tuned, then a large resonant voltage signal will be developed across this secondary winding 32. At the threshold of sensitivity of the system, the resonant voltage signal across the secondary winding 32 will exceed the negative DC voltage across load resistor 42 and accordingly a positive voltage signal will be passed by the first diode detector 38 to make the terminal 49 positive. The first time delay capacitor 48 is accordingly charged positive at terminal 49 because the third diode detector 50 completes the loop circuit from secondary winding 32 through ground and up through load resistor 42. Capacitor 48 may be a 50-microfarad capacitor and this combined with the resistor 42 value of 43,000 ohms may establish a time delay of charging of approximately 2 seconds. The discharge resistor 51 also enters into this because it continuously discharges the capacitor 48. Resistor 51 is made of smaller value, for example 6,800 ohms, for a discharge time constant of about one-third of a second. Accordingly upon an audio signal of the proper frequency being received and detected, capacitor 48 will charge in about one-quarter second to a voltage level high enough so that this positive voltage 49 will be passed to the base of transistor 56 and turn it on and pull in relay 58. There are two reasons why the actual time delay of charging is much faster than the calculated time delay of charging; the voltage rises on secondary 32 with a resonant voltage signal, and capacitor 48 charges to only a fraction of the time constant value of $(2-1/\epsilon)$ or 63.2 percent of its final value. If left to charge fully, it might reach 10 volts, but on reaching about 0.7 volts, it will overcome the forward voltage drop of the base-emitter junction of transistor 56 to turn it one.

As soon as the relay 58 pulls in, the normally open contacts 72 are closed to control the load, for example, the motor driving the garage doors between open and closed positions. Even before the normally open contacts 72 are closed, the normally closed contacts 70 are opened. This removes the ground on the terminal 71 and permits the potential thereof to rise. Previously the first bleeder resistor 63 was connected between the DC supply lead 61 and ground. Now that this ground connection on terminal 71 is removed, current flow through the second bleeder resistor 64 and the second time delay capacitor 65 to the terminal 55. This is a charging current for the time delay capacitor 65 and accordingly as long as this charging current flows the terminal 55 will be maintained positive and transistor 56 will be maintained in the conductive state.

The first time delay capacitor 48 delays only the pull-in of relay 58 but not the dropout. The second time delay capacitor 65 delays only the dropout of the relay 58 but not the pull-in. The reason for the separation of functions of these two time delay capacitors is to improve the reliability of operation. Assume for the moment that the detector 50 were not in the circuit between the time delay capacitor 48 and ground. In such case this time delay capacitor 48 would delay not only the turn on, but also the turnoff of capacitor 65 and accordingly both the pull-in and dropout of relay 58. The capacitor 48 would then act as a filter capacitor and would be charged positive on terminal 49 with any and all signals passed by the first detector 38. Accordingly spurious signals if they came frequently enough would be passed by detector 38 and build up the positive potential on terminal 49 to the point where the relay 58 would pull in. This would give a false operation to the garage door operator which is quite undesirable especially to have the door open on an attached garage when the family is not at home.

It has further been found that in certain locations there is a considerable amount of telemetering signals primarily for Government purposes, for example, weather balloons. These telemetering signals are often on the same carrier frequency in the VHF band and telemetering signals include several audiofrequency modulation frequencies which are keyed on and off at approximately 50 percent on, 50 percent off repetition rates. These repetition rates are in the order of speeds similar to teletype circuits for example 10 to 60 words per minute. This would be from 30 to 200 characters per minute and hence the on periods might be from one-sixtieth to one four-hundredth of a second. This is the reason for choosing a time delay on the first time delay capacitor 48 of approximately one-quarter second so that any pulse frequency of the right carrier and modulation frequencies will not trigger the system 11 into operation, so long as the keyed or pulsed tone signal is turned on for less than one-quarter of a second. In such a manner telemetering signals are rejected even though of the same carrier and modulation frequencies to which the system 11 is tuned. The reason these telemetering signals are rejected is because the discharge resistor 51 is continually discharging the capacitor 48 and also the positive charge on capacitor 48 at terminal 49 cannot be passed to the transistor 56, because detector 50 is poled in the wrong direction. Accordingly as soon as the detected signal is no longer received, then there is an immediate turnoff of transistor 56 from this first time delay capacitor 48.

However, as stated above, the second time delay capacitor 65 comes into the circuit as soon as the contact blade moves downwardly away from the normally closed contact 70. In fact, if this relay armature is moved by hand downwardly toward the relay core, it will be pulled rapidly downward because of the charging current through the second time delay capacitor 65 which turns on transistor 56.

It is human nature that the user of the remote transmitter will attempt to open the garage doors at as great a distance as possible. The user learns by experience the approximate maximum range by noting his position in accordance with some landmark. Accordingly, on each succeeding time of use, the user is prone to push the button a little bit sooner and try to stretch the range of the transmitter and receiver combination. This means that is has been observed that the entire system is operated at fringe area operation with just a minimum amount of signal, e.g. 5 microvolts, being received on the receiving antenna to cause pull-in of the relay. Also at 250 to 300 mHz., and with a moving transmitter, there are Fresnel zone effects which mean that the direct and reflected signal combined alternatively in addition and in subtraction and this makes the total signal amplitude on the antenna 12 vary in magnitude. This variation in signal strength would tend to cause chatter on the relay contacts and this chatter or false operation is in large measure eliminated by the present invention.

Resistors 63 and 64 may have value of 220,000 and 33,000 ohms, and capacitor 65 may have a value of 1.0 microfarad, for example. This gives a typical time delay of charge of capacitor 65 of about one-quarter of a second. Accordingly as soon as the relay pulls in it will remain pulled in for at least this one-quarter second of the charging time of capacitor 65 even though temporarily the signal strength on the antenna 12 is decreasing below the level at which the relay is pulled in. It is desirable to have the relay contacts 72 remain closed once they have been closed in order to avoid false operation of the garage door operator. Many door operators have four conditions of operation; namely the closed and off, door moving upwardly, door open, and door moving downwardly conditions. If once the relay contacts 72 are closed this would establish a door opening condition. Now if the relay contacts 72 were to open and then reclose, this would give a false signal to the door operator to stop the door. It would then be necessary to provide two more closings and two more openings of the contacts 72 in order to get the door moving upwardly again. A person approaching the garage door and pressing the transmitter button is desirous of having the door move upwardly and it is annoying and sometimes dangerous to have false operation with the door stopping and then have to be moved downwardly, stopped and then moved back upwardly signal to achieve the proper door condition. The present circuit with about one-quarter second time delay of dropout means that the motorist may drive through a Fresnel zone null at the fringe area or threshold of sensitivity, and still this will not cause the relay to falsely dropout. The two separate time delays eliminate these false operation of contacts 72 and eliminate these annoying and possibly dangerous conditions.

The protective capacitor 76 is connected across the normally closed contacts 70 and is a small capacity. It protects against inadvertant physical shock or movement opening the normally closed contacts 70 which might set the second time delay capacitor 65 into operation. The capacitor 77 across the relay coil 58 smooths out pulses of current energizing this winding 58 and also contributes to the time delay of dropout of the relay 58.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

I claim:

1. A radio receiver system for receiving a given frequency signal and subject to random noise, comprising, in combination,
- amplifier means for said given frequency signal,
- detector means having an input from the output of said amplifier means and having an output terminal,
- a relay,
- means connecting the output terminal of said detector means to said relay to control the energization of said relay,
- and first means connected in circuit with said detector means to delay only the pull-in but not the dropout of said relay.

2. A radio receiver system as set forth in claim 1 wherein said first means includes a time delay capacitor,
- means connecting said time delay capacitor in said first means to be charged by the detector means output,
- and means responsive to one of the charging and discharging time of said time delay capacitor to establish the delay of pull-in of said relay.

3. A radio receiver system as set forth in claim 2, including means connecting said time delay capacitor in circuit with said detector means output to be charged in one polarity and after the time delay of charging to establish pull-in of said relay,
- impedance means to discharge said capacitor,
- and a unidirectional current device connected in circuit with said time delay capacitor to prevent discharge thereof in a direction maintaining said relay energized.

4. A radio receiver system as set forth in claim 1, including, a second means to delay the dropout but not the pull-in of said relay.

5. A radio receiver system as set forth in claim 4, wherein said second means includes, a second time delay capacitor,
- charging means for said second time delay capacitor,
- and means responsive to one of the charging and discharging time of said second time delay capacitor to establish the delay of dropout of said relay.

6. A radio receiver system as set forth in claim 5 including a DC power supply in said system,
- said charging means deriving energy from said DC power supply to charge said second time delay capacitor,
- and means responsive to the charging current through said second time delay capacitor to establish the delay of dropout of said relay.

7. A radio receiver system as set forth in claim 6 including a transistor connected in circuit with said relay, and means responsive to the charging current through said second time delay capacitor to maintain said transistor in a conducting condition to establish the delay of dropout of said relay.

8. A radio receiver system as set forth in claim 5 including contact means actuated by said relay, and means controlling said charging means for said second time delay capacitor in accordance with actuation of said contact means of said relay.

9. A radio receiver system for receiving a given frequency signal and subject to random noise, comprising in combination, amplifier means for said given frequency signal, detector means having an input from the output of said amplifier means, said detector means including a first unidirectional current device connected to supply voltage of one polarity to a detector output terminal, a time delay capacitor connected to said detector output terminal with said first device poled to conduct current to charge said capacitor of said one polarity on said detector output terminal upon passage of current by said first device in accordance with a detected given frequency signal, a relay having a winding, first means connected to energize said relay winding upon charge of said time delay capacitor, and a second unidirectional current device connected in circuit with said time delay capacitor and poled to conduct current in the same direction as said first device but not in the opposite direction to thereby immediately terminate the means to energize said relay winding upon termination of said detected given frequency signal.

10. A radio receiver system as set forth in claim 9 including said second unidirectional current device being connected in series with said time delay capacitor across the output of said detector means.

11. A radio receiver system as set forth in claim 9 wherein said receiver system is adapted to receive an RF carrier modulated by a given audiofrequency signal and subject to interfering telemetering signals including, a superregenerative circuit as part of said amplifier means, said superregenerative circuit having a high gain to amplify any noise and any telemetering signals to a large extent, said detector means including resonant frequency means resonant to said given frequency signal to establish a large resonant voltage signal on said detector output terminal compared to the noise signal thereon.

12. A radio receiver system as set forth in claim 9 wherein said detector means includes a first detector diode as said first unidirectional current device, resonant frequency means connected to said first detector diode to supply thereto a resonant voltage signal dependent primarily on the detection of said given frequency signal, a second detector diode, a resistor connected to said second detector diode to supply thereto a voltage dependent upon all detected signals and primarily said random noise.

means in said detector means effectively connecting in series opposition the voltages on the outputs of said first and second detector diodes so that the voltage applied to said detector output terminal is passed only upon the voltage from said resonant voltage signal exceeding the voltage from said second detector diode.

13. A radio receiver system as set forth in claim 9 including means connecting said time delay capacitor to be directly energizable by said first unidirectional current device, and means connecting said second unidirectional current device to prevent a discharge of said time delay capacitor to said detector output terminal to thus prevent passing a signal to said means to energize said relay winding.

14. A radio receiver system as set forth in claim 9 including discharge means connected to said time delay capacitor to discharge same other than through said means to energize said relay winding.

15. A radio receiver system as set forth in claim 9 including a discharge resistor connected in parallel with said time delay capacitor.

16. A radio receiver as set forth in claim 9 including a second means to energize said relay winding connected effectively in parallel with said first means to energize said relay winding.

17. A radio receiver system as set forth in claim 16 wherein said second means to energize said relay winding includes a bleeder resistor and a second capacitor, means to charge said second capacitor through said bleeder resistor with a predetermined second time delay, and means controlled by the energization of said relay winding to commence operation of said second means to energize said relay winding.

18. A radio receiver system as set forth in claim 17 including a DC power supply, means to supply charging current through said bleeder resistor and second capacitor from said DC power supply, and contact means controlled by said relay winding to establish operation of said charging of said second capacitor.

19. A radio receiver system as set forth in claim 18 wherein said contact means is a single pole double throw contact with normally closed contacts controlling charging of said second capacitor.

20. A radio receiver system as set forth in claim 16 including a transistor having an input controlled by said first and second means to energize said relay winding, and means connecting the output of said transistor to energize said relay winding.

21. A radio receiver system as set forth in claim 9 including a transistor connected as said first means to energize said relay winding, a bleeder resistor and a second capacitor connected in series and to said transistor as a second means to energize said relay winding, and means to charge said second capacitor through said bleeder resistor whereby during the charge period of said second capacitor said transistor is turned on and after the charging is completed the transistor is no longer maintained turned on thereby so that instant recontrol of the radio receiver system is achieved upon termination of the detected given frequency signal.